A. D. JUDD.
Paper-Clips.

No. 147,561. Patented Feb. 17, 1874.

Witnesses
Chas. H. Smith
Geo. T. Pinckney

Inventor
Albert D. Judd,
per Lemuel W. Serrell
Atty.

UNITED STATES PATENT OFFICE.

ALBERT D. JUDD, OF NEW HAVEN, CONNECTICUT.

IMPROVEMENT IN PAPER-CLIPS.

Specification forming part of Letters Patent No. 147,561, dated February 17, 1874; application filed January 2, 1874.

*To all whom it may concern:*

Be it known that I, ALBERT D. JUDD, of New Haven, in the State of Connecticut, have invented an Improvement in Paper-Clips, of which the following is a description:

Paper clips and clamps for holding letters and papers of various kinds, have been made in which two jaws are hinged together, and a helical or other spring employed to press the jaws toward each other.

My invention is made for simplifying the construction of the clip and preventing friction, so that the spring may exert its force to press the clamps toward each other, and retain the letters or other sheets placed between them.

I make use of a headed tie-rod to connect the two parts of the clamp together, and one portion of the clamp is recessed where this tie-rod passes through, so that the clamp is free to move beneath the head of the tie-rod, and upon the respective portions of the clamp there are flanges which steady the parts and support them under the pressure upon the handle portions of the clamps in opening the jaws.

Figure 1:
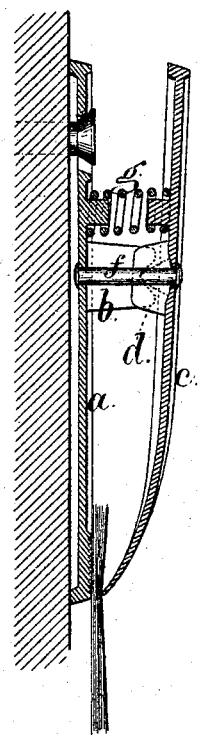
Figure 2:
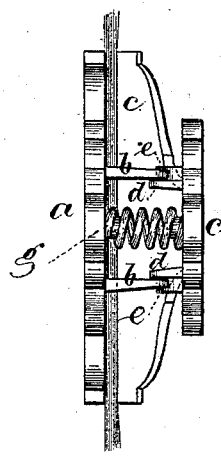

In the drawing, Figure 1 is a vertical section of the clip, and Fig. 2 is an end view of the same.

The clip is composed of the back plate $a$, with the flanges $b$ cast as part of the same, and the front plate $c$ with its flanges $d$, and V-shaped or rounding projections $e$, as another casting.

The back and front plates are held together by the tie-rod $f$, and the helical spring $g$ gives the necessary pressure for holding the articles clamped. These flanges $b$ and $d$ are made as shown in Fig. 2, with the flanges $d$ passing between the flanges $b$ to steady the clamps laterally, and with the V-shaped projections $e$ passing into the notched ends of the flanges $b$.

These clamps can be made of cast-metal, highly ornamental, and they can be cast with the holes for the tie-rod, so that the cost of construction is much less than those before made.

I claim as my invention—

1. The paper-clip made of the plates $a$ and $c$, connected together by the tie-rod $f$ passing loosely through a hole in one clamp, in combination with the spring $g$, notched flanges $b$, projections $e$, and guide-flanges $d$, as and for the purposes set forth.

2. In combination with the clamping-plates $a$ and $c$ of a paper-clip, the V-shaped fulcrum projections upon one plate, and notched projections on the other plate, and a spring to keep the clamping ends of the plates toward each other, substantially as set forth.

Signed this 23d day of December, A. D. 1873.

A. D. JUDD.

Witnesses:
 GEO. T. PINCKNEY,
 CHAS. H. SMITH.